2 Sheets—Sheet 1.

A. S. HUNTER,

Assignor to E. H. BARNEY & R. GIBSON.

SKATE.

No. 10,293. Reissued Mar. 6, 1883.

Witnesses.
Wm H Chapin
R. H. Hyde

Inventor
Alpheus S Hunter
by Henry A Chapin
Atty

N. PETERS, Photo-Lithographer, Washington, D. C.

A. S. HUNTER,

Assignor to E. H. BARNEY & R. GIBSON.

SKATE.

No. 10,293. Reissued Mar. 6, 1883.

Witnesses.
Wm H Chapin
R. H. Hyde

Inventor.
Alpheus S. Hunter
by Henry A. Chapin
Atty

N. PETERS, Photo-Lithographer, Washington, D. C.

UNITED STATES PATENT OFFICE.

ALPHEUS S. HUNTER, OF NEWBURG, NEW YORK, ASSIGNOR TO EVERETT H. BARNEY AND ROBERT GIBSON.

SKATE.

SPECIFICATION forming part of Reissued Letters Patent No. 10,293, dated March 6, 1883.

Original No. 91,539, dated June 22, 1869; antedated June 19, 1869; Reissue No. 10,068, dated April 4, 1882. Application for reissue filed January 11, 1883.

*To all whom it may concern:*

Be it known that I, ALPHEUS S. HUNTER, of Newburg, in the county of Orange and State of New York, have invented an Improved Skate; and I do hereby declare that the following is a full, clear, and exact description of the same, reference being had to the annexed drawings, and to the letters of reference marked thereon.

The nature of my invention consists in the mode of fastening and unfastening the skate to and from the boot or shoe of the person who is using the same. The operation is done almost instantaneously. Only one motion of the lever at the heel end of the skate secures the skate firmly to the foot. The same motion on the same lever backward unfastens the skate immediately, so that it drops down from the foot. Besides this improvement in gaining time or avoiding the sometimes disagreeable work of fastening the skates by straps, this skate is fastened on those parts of the boot where it does not give the least pressure to the foot, which is very often a disagreeable and dangerous peculiarity of skates. This skate is fastened at one end to the heel of the boot and at the other end to the sides of the sole, right across the ball of the foot. The skate is also easily adjustable for any size of heel and for the width of sole, and combines in this way all the good qualities of any other kind of skates.

Figure 1:
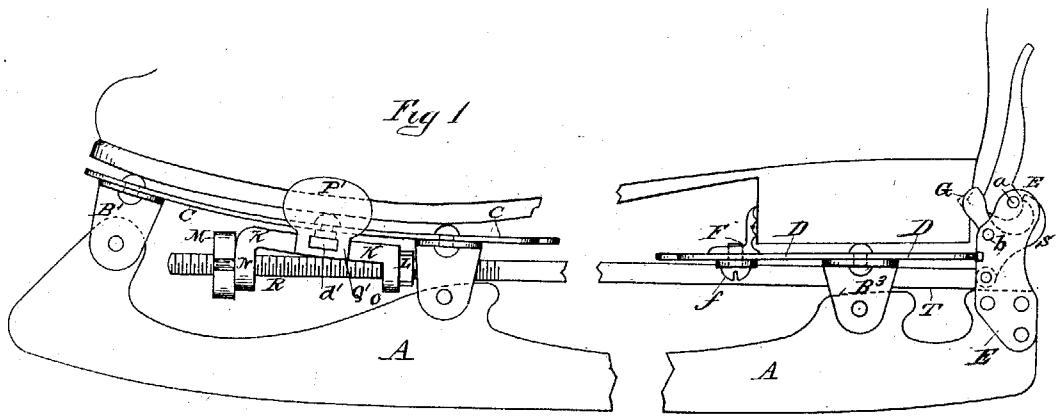
Figure 2:
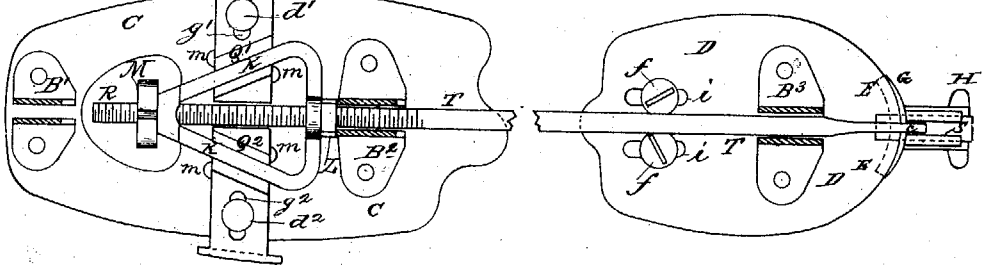
Figure 3:
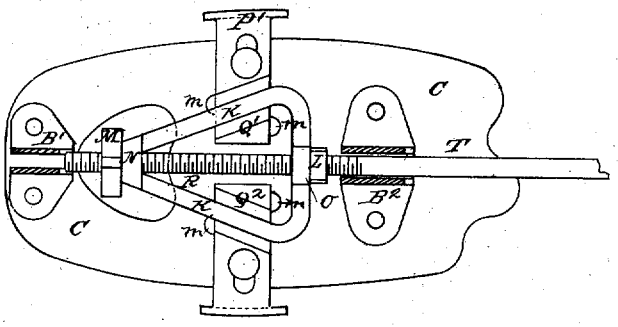
Figure 4:
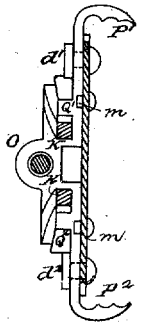
Figure 5:
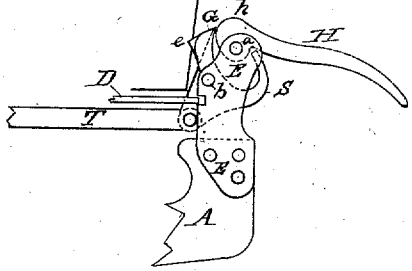

Figure 1 represents a side view of the skate when fastened to the foot. Fig. 2 is a bottom view of the same in the same position. Fig. 3 shows a bottom view of the foot-plate in position when the skate is loose. Fig. 4 is a cross-section of the foot-plate. Fig. 5 shows the back end of the skate only, with the lever in position when the skate is loose.

A A is the skate-iron, to which are fastened the foot-plate C C by the brackets $B'$ and $B^2$ and the heel-plate D D by the brackets $B^3$.

To the heel-plate D D is firmly secured, by means of two screws, *f f*, a strong angle-plate, F, with corrugated face, which takes hold of the inside face of the heel, and which plate can be adjusted to the size of the heel by altering its place along the two slots *i i*, cut in the heel-plate for this purpose.

To the foot-plate C C are secured two strong angle-plates, $P'$ $Q'$ and $P^2$ $Q^2$, which are movable crosswise to lengthen or shorten this distance between the two upright standing plates $P'$ $P^2$, to accommodate any size sole to be firmly held between, and to open or shut enough to firmly hold or let go the sole of the boot for which the position of angle-plates was adjusted. These angle-plates $P'$ $Q'$ and $P^2$ $Q^2$ are guided in their motion by two strong bolts, $d'$ $d^2$, with large heads, and by pins *m m* along the edges, and slots $g'$ $g^2$ in plates $Q'$ $Q^2$. This opening and closing of the plates $P'$ $P^2$ is done by a double-acting wedge-shaped piece, K K, which is actuated by a rod, T T R, running through the eyes N and O at the ends of the wedge, on which rod is cut a thread for a suitable length, and two nuts, L and M, regulate the position of the wedge K K on the rod.

In the plates $Q'$ $Q^2$ are cut suitable grooves, on their lower faces, for the legs of the wedge K K to slide in, and by means of these grooves those plates are set outward as soon as the wedge is shifted nearer the end R by means of the two nuts L and M, and drawn inward when the wedge is placed farther away from the end R. This regulation of position of the wedge on the rod by means of those nuts L and M is done to fit a pair of skates for a certain pair of boots or for a certain width of soles.

The opening and closing of the angle-plates $P'$ $P^2$ for fastening the skates to the boots is done by shifting the wedge K with the rod T R together. This is done by another arrangement made at the heel end of the skate. For this purpose are riveted to the back end of the skate-iron two strong cheeks, E E, which carry at the top end a lever, H, the fulcrum of which is at *a*, and the short end of which is an eccentric cam in such a shape that any pressure working on the flat face of the small spot *h* will produce a tendency to turn the lever H inward toward the boot, never outward. This lever H is brought in connection with another three-armed lever, G S *c*, the fulcrum of which is at *b*. The short lever-arm of lever H is working between the two arms G and S in such a way that the arm G is pushed inward toward the heel of the boot when the lever H is moved up, as shown in Fig. 1. That same movement pulls the lever-arm *c* back, and with it the rod T T, and with the rod the wedge K K, which in turn pulls, by the action of its inside faces, the plates $P'$ $P^2$ together, and draws them firmly to the edges of the sole of the boot, where their corrugated faces lodge tightly in the leather and hold the skate securely to the boot.

The arm G has a circular shape, and is armed with a sharp projection, *e e*, which is pressed firmly into the heel by the lever H in the position as shown in Fig. 1, and holds the heel securely between the angle-plate F and circular plate G. The small flat face *h* lies hard against the back of the lever-arm G, and all back-pressure from the boot against the action of the lever H has the tendency to hold the skate firmer to the boot, as the direction of pressure runs below the fulcrum *a*. Therefore only by a power attached to the long arm of the lever H can the skate be loosened from the boot. As soon as sufficient power is used to turn back the lever H, the powerful grip is gone which the different corrugated faces or plates had on the different places of the boot, and by moving the lever H back as far as shown in Fig. 5 the back face of lever H, near the fulcrum, took hold of the second arm, S, of the lever G S *c* and pushed it down, so that arm *e* came in position, as shown in Fig. 5. It pushed forward the rod T T R and wedge K K, which, by the action of its outside faces, pushed apart the plates $P'$ and $P^2$ and let go the boot. The same action of lever H on the arm S retracted the arm G from the heel, and with it the sharp projection *e e* out of the heel, so that simultaneously at all points the boot was free from the skate or the skate from the boot.

The whole action of the lever H on the different parts is very powerful. It is the combination of lever and wedge, each for itself a powerful machine.

If the skates are regulated or adjusted for a pair of boots, the whole operation of putting on the skate is: Put the foot on the skate so that the inside face of the heel lies on the plate F and pull the lever H to the position as shown in Fig. 1.

The operation for taking off the skate is: Pull lever H back, as shown in Fig. 5, and the skate is off.

What I claim as my invention, and desire to secure by Letters Patent, is—

1. The mode of fastening or unfastening skates to and from the boot or shoe by the combined action of lever H, lever G S *c*, rod T T R, double-acting wedge K K, with plates $P'$ $Q'$ and $P^2$ $Q^2$, and angle-plate F, as specified.

2. The manner of adjusting the skate to the boot by means of the rod T T R, nuts L and M, double-acting wedge K K, and the corresponding grooves in the angle-plates $P'$ and $Q'$ and $P^2$ and $Q^2$ for the foot-plate, and by means of movable angle-plate F for the heel, as specified.

3. The combination of devices for clamping a skate to the heel at the back and to the sole at the sides, substantially as described, with a lever for operating such clamps for fastening and unfastening, and with a regulating-screw independent of the lever.

ALPHEUS S. HUNTER.

Witnesses:
JAMES T. BOOTHROYD,
CHARLES J. LAWSON.